(12) United States Patent
Kircher et al.

(10) Patent No.: US 7,252,341 B2
(45) Date of Patent: Aug. 7, 2007

(54) VEHICLE SEAT, IN PARTICULAR A MOTOR VEHICLE SEAT

(75) Inventors: Sascha Kircher, Uhingen-Holzhausen (DE); Matthias Dittler, Stuttgart (DE); Ulf Schlenker, Erkenbrechtsweiler (DE); Thomas Kaiser, Ostfildern (DE)

(73) Assignee: Recaro GmbH & Co. KG, Kirchheim unter Teck (DE)

( * ) Notice: Subject to any disclaimer, the term of this patent is extended or adjusted under 35 U.S.C. 154(b) by 0 days.

(21) Appl. No.: 11/546,086

(22) Filed: Oct. 11, 2006

(65) Prior Publication Data

US 2007/0040440 A1 Feb. 22, 2007

Related U.S. Application Data

(63) Continuation of application No. PCT/EP2005/001489, filed on Feb. 15, 2005.

(30) Foreign Application Priority Data

Apr. 14, 2004 (DE) .................... 10 2004 018 001

(51) Int. Cl.
| | |
|---|---|
| A47C 7/18 | (2006.01) |
| A47C 7/02 | (2006.01) |
| A47C 7/14 | (2006.01) |
| A47C 7/24 | (2006.01) |

(52) U.S. Cl. .................... 297/452.55; 297/452.24; 297/452.31; 297/452.34; 297/452.38; 297/452.56; 297/452.57; 297/452.58

(58) Field of Classification Search ........... 297/452.55, 297/452.25, 452.23, 452.24, 452.33, 452.34, 297/452.36, 452.38, 452.21, 452.22, 452.29, 297/452.31, 452.56, 452.58, 440.1, 440.11, 297/440.14, 440.15

See application file for complete search history.

(56) References Cited

U.S. PATENT DOCUMENTS

| | | | | |
|---|---|---|---|---|
| 4,582,361 A | * | 4/1986 | Kennel | 297/452.56 |
| 4,603,907 A | * | 8/1986 | Witzke | 297/452.56 |
| 4,607,887 A | * | 8/1986 | Vail | 297/452.57 X |
| 4,697,848 A | * | 10/1987 | Hattori et al. | 297/452.34 |
| 4,746,168 A | | 5/1988 | Bracesco | |
| 4,875,736 A | * | 10/1989 | Brambilla | 297/440.1 |
| 4,883,320 A | * | 11/1989 | Izumida et al. | 297/452.56 |
| 5,022,709 A | * | 6/1991 | Marchino | 297/452.24 |
| 5,058,953 A | * | 10/1991 | Takagi et al. | 297/452.58 X |
| 5,553,924 A | * | 9/1996 | Cantor et al. | 297/452.55 X |
| 5,628,545 A | * | 5/1997 | Perthuis et al. | 297/452.58 X |
| 5,857,750 A | * | 1/1999 | Kashiwamura et al. | 297/452.55 |
| 5,988,757 A | * | 11/1999 | Vishey et al. | 297/452.31 |
| 6,010,195 A | * | 1/2000 | Masters et al. | 297/452.55 |

(Continued)

FOREIGN PATENT DOCUMENTS

DE 101 12 022 C1 6/2002

(Continued)

Primary Examiner—Rodney B White
(74) Attorney, Agent, or Firm—Womble Carlyle Sandridge & Rice, PLLC

(57) ABSTRACT

In the case of a vehicle seat, in particular a motor vehicle seat, with a seat part and a backrest as seat components, of which at least one seat component has a structure (11) and at least one adapter (15) arranged on the structure (11), the adapter (15) bears extensively and with a form-fitting connection on the structure (11).

31 Claims, 2 Drawing Sheets

U.S. PATENT DOCUMENTS

| | | | |
|---|---|---|---|
| 6,027,171 A * | 2/2000 | Partington et al. | 297/452.55 X |
| 6,106,071 A * | 8/2000 | Aebischer et al. | 297/452.55 X |
| 6,199,252 B1 * | 3/2001 | Masters et al. | 297/452.55 X |
| 6,213,557 B1 * | 4/2001 | Aebischer et al. | 297/452.55 |
| 6,409,269 B1 * | 6/2002 | Aebischer et al. | 297/452.55 |
| 6,520,541 B1 * | 2/2003 | Cantor | 297/452.55 X |
| 6,659,553 B2 * | 12/2003 | Achleitner et al. | 297/452.24 X |
| 6,672,671 B1 * | 1/2004 | Stoschek | 297/452.57 |
| 6,896,324 B1 * | 5/2005 | Kull et al. | 297/452.55 X |
| 7,025,423 B2 * | 4/2006 | Fujita et al. | 297/452.38 |
| 7,083,230 B2 * | 8/2006 | Kull et al. | 297/452.55 X |
| 7,140,681 B2 * | 11/2006 | McMillen | 297/452.34 X |
| 2001/0005095 A1 | 6/2001 | Karschin et al. | |
| 2003/0197413 A1 | 10/2003 | Walker et al. | |

FOREIGN PATENT DOCUMENTS

| | | |
|---|---|---|
| EP | 1 110 809 A2 | 6/2001 |
| EP | 1 332 914 A1 | 8/2003 |

\* cited by examiner

VEHICLE SEAT, IN PARTICULAR A MOTOR VEHICLE SEAT

CROSS-REFERENCE TO RELATED APPLICATION

The present application is a continuation of International Application PCT/EP2005/001489, which was filed Feb. 15, 2005. The entire disclosure of International Application PCT/EP2005/001489, which was filed Feb. 15, 2005, is incorporated herein by reference.

BACKGROUND OF THE INVENTION

The present invention relates to a vehicle seat, in particular to a motor vehicle seat, having a seat part and a backrest as seat components, with at least one of the seat components having a structure and at least one adapter arranged on the structure.

EP 1 110 809 A2 discloses a vehicle seat of the type described immediately above, in which basic modules are fixed on a standard seat frame and/or backrest frame—without changing the structure—by way of adapters in the form of straps or wires. The basic modules in turn bear additional subassemblies, such as lordosis supports, side cheeks, supporting brackets, shoulder supports, ventilators or seat air-conditioning systems. The adapters are fixed on the frame or on nuts fastened thereto, for example by way of a screw connection or rivet connection, with the intention being for the frames to be weakened as little as possible.

BRIEF SUMMARY OF SOME ASPECTS OF THE INVENTION

An aspect of the present invention is the provision of improvements to a vehicle seat of the type mentioned above. In accordance with one aspect of the present invention, a vehicle seat, in particular a motor vehicle seat, has a seat part and a backrest as seat components. At least one of the seat components has a structure and at least one adapter arranged on the structure. The adapter bears extensively and with a form-fitting connection on the structure.

Because the adapter bears extensively and with a form-fitting connection on the structure, the possibility of a relative movement between adapter and structure is restricted to few directions without a fixed connection being necessary. Regarding the adapter bearing extensively and with a form-fitting connection on the structure, it should be understood that, firstly, the bearing goes beyond a pure point-type contact and takes up a considerable part of the mutually facing surfaces of the adapter and of the structure (bearing over a large area) and, secondly, in the case of this considerable part of the mutually facing surfaces, positive projections and negative depressions of the structure are reciprocated by (e.g., respectively associated with) an inverse contour of the adapter.

As mentioned above, the possibility of relative movement between adapter and structure is restricted to few directions without a fixed connection being necessary. The movement possibility is preferably further restricted to the installation direction by the adapter extending between mutually opposite sides of the structure, for example between two opposite limbs of a frame. This remaining movement possibility is preferably suppressed by a cover being pulled over a pad, which bears against the adapter, and the adapter being at least partially fastened to the structure, as a result of which the adapter and structure are held fixedly together. However, if the need arises, the adapter may additionally nevertheless be fastened to the structure, for which purpose use is preferably made of openings or the like present on the structure for other reasons.

The adapter is the interface between the structure and the pad. The adapter, which is arranged on the structure, firstly serves for shaping the pad, i.e. it decisively influences —by way of its own shape and configuration—the shape which the pad assumes, in particular if the adapter is greatly contoured. In this respect, the adapter is assigned to the pad and is treated as an integral part of the pad, for example if the adapter and the pad are covered by a common cover, the cover preferably reaches as far as the structure. The structure secondly gives the adapter the support necessary for the function of shaping the pad, namely by way of the bearing according to the invention. In this respect, the adapter constitutes an advantageous addition to the structure, which upgrades the structure in a sporty, functional and comfort respect. Otherwise, without the adapter the structure could only support the pad in a simple manner (with only a small degree of shaping and without functions).

The adapter is preferably a single-piece component which is preferably composed of a rigid foam, which simplifies the production and the installation. This design of the adapter is advantageous when the adapter extends in the longitudinal direction of the seat component and laterally form-giving material portions with a supporting function are integrally formed on the adapter in order to improve the lateral support of the occupant compared with a structure without supporting elements and to ensure a distortion-free installation compared to welded-on supporting elements. In this case, shaping is to be understood as meaning that the corresponding material portion has a significant influence of the shape of the adapter, for example the material portion results in a doubling of the height of the adapter without a material portion. In addition, the material used is advantageous if the adapter is to have a passive crash protection function, according to which, in the event of a crash, the material of the adapter is to absorb and/or dissipate energy, which increases the protection of the occupant. In the case of the seat part, an anti-submarining ramp may be integrally formed on the adapter, which provides a further crash protection function.

The adapter is preferably also used to increase the comfort for the occupant by individual subassemblies being arranged or integrated on or adapted to (e.g., operatively associated with) the adapter, in particular being mounted and/or fixed thereon, in particular cheek adjusters, control devices and cover attachments, disconnectors and guiding means, but also—in the case of the backrest—lordosis supports and/or shoulder inclination adjusters and/or—in the case of the seat part—seat surface extensions.

The adapter with the optionally provided subassemblies upgrades the vehicle seat to a sports seat.

Other aspects and advantages of the present invention will become apparent from the following.

BRIEF DESCRIPTION OF THE DRAWINGS

In the following, the present invention is explained in more detail with reference to an exemplary embodiment which is illustrated in the drawings, in which.

DETAILED DESCRIPTION OF EXEMPLARY EMBODIMENT

Figure 1:
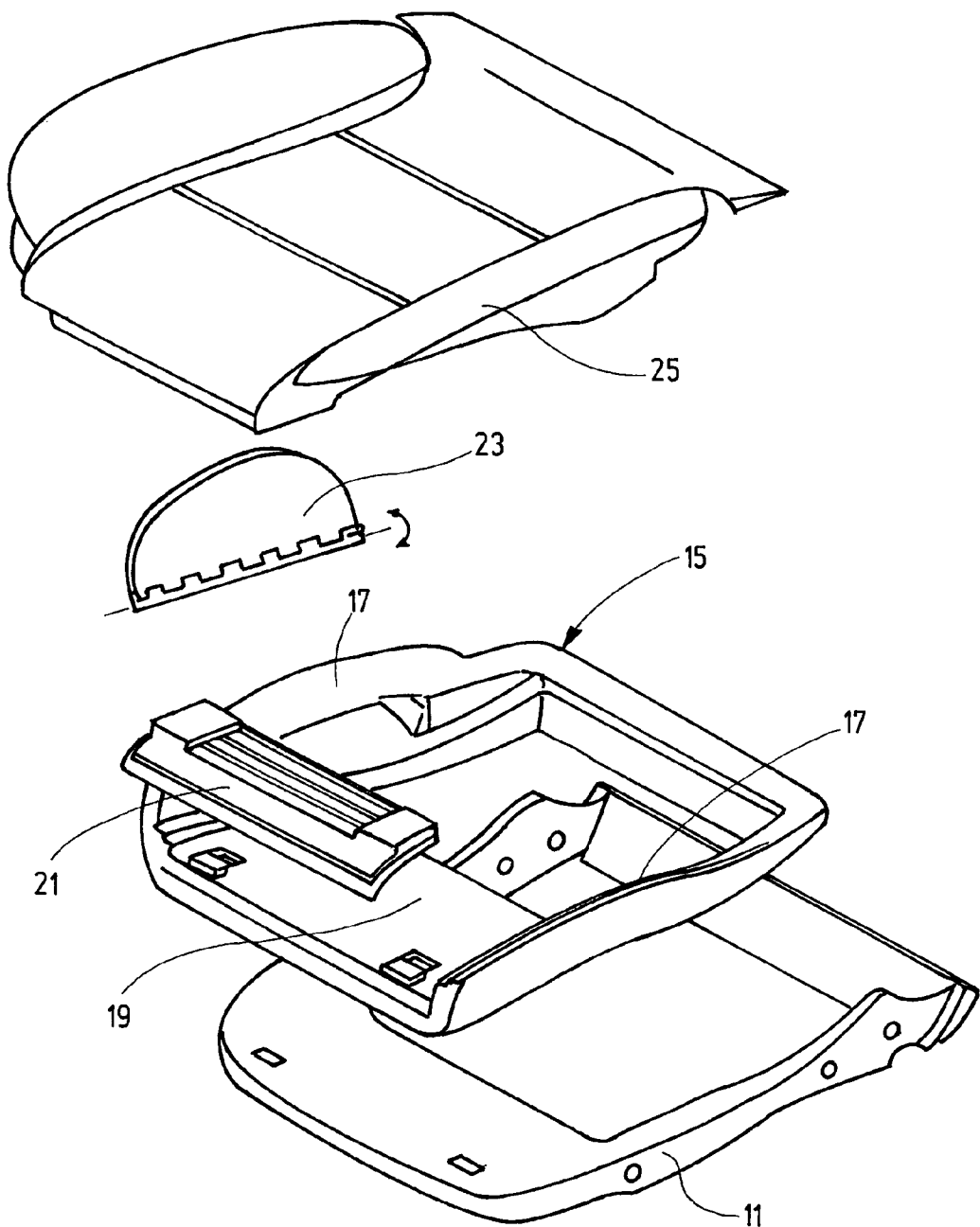
FIG. 1 shows an exploded drawing of a seat cushion of the exemplary embodiment.
Figure 2:
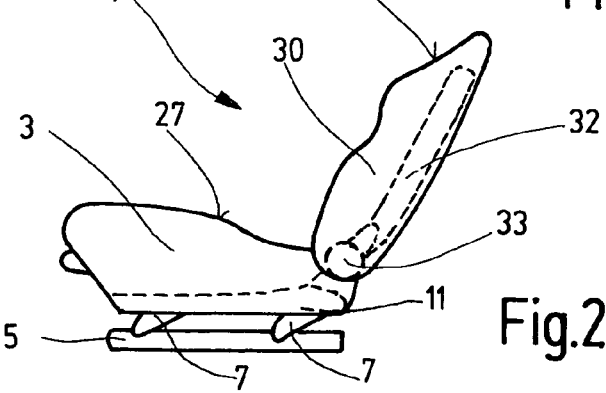
FIG. 2 shows a diagrammatic side view of the exemplary embodiment.

A vehicle seat 1 is designed as a sports seat for a motor vehicle. The vehicle seat 1 has a first seat component that is in the form of a seat part 3. Two pairs of parallel seat rails 5 are provided for the longitudinal adjustment of the seat part 3. The seat rails 5 define the longitudinal direction of the seat part 3. Two pairs of rockers 7 (e.g., pivotable supports) are coupled to the seat rails 5 for adjusting the height of the vehicle seat 1. A seat cushion structure 11 is pivotably coupled to, and supported by, the rockers 7. The seat cushion structure 11 can also be referred to as seat frame, because of its shape as an encircling frame with four limbs.

The seat cushion structure 11 bears a single-piece seat cushion adapter 15 of hard foam, in particular polyurethane. Like the seat cushion structure 11, the seat cushion adapter 15 is designed as an encircling frame. In this case, the supported seat cushion adapter 15 bears extensively and with a form-fitting connection onto the seat cushion structure 11. As a result, the possibility of a relative movement between the seat cushion adapter 15 and seat cushion structure 11 is limited. Because the seat cushion adapter 15 bears against all four limbs of the seat cushion structure 11, after the seat cushion adapter 15 is installed on the seat cushion structure 11, the only possible relative movement between the seat cushion adapter 15 and the seat cushion structure 11 is in the installation direction. During the installation of the seat cushion adapter 15 on the seat cushion structure 11, the seat cushion structure 11 remains unchanged, in particular unweakened.

In the longitudinal direction of the seat, the seat cushion adapter 15 has lateral, raised, form-giving material portions 17 that have a supporting function in order to improve the lateral support of the occupant in relation to the relatively flat seat cushion structure 11. The seat cushion adapter 15 preferably also has a front, forwardly rising, form-giving material portion 19 that serves as an anti-submarining ramp in the event of a crash. As a further passive crash protection function, the rigid foam can absorb and dissipate energy in the event of a crash.

Individual subassemblies are optionally arranged or integrated on or adapted to the seat cushion adapter 15, in particular the subassemblies are mounted and/or fixed on the seat cushion adapter 15. An example of such a subassembly is a seat surface extension 21, which can be displaced longitudinally in the longitudinal direction of the vehicle seat 1 relative to the seat cushion adapter 15, possibly by way of foamed-in rails (e.g., rails fixed to the foam of the seat cushion adapter 15). Another example of such a subassembly is a pair of side cheek adjusters 23. Each of the side cheek adjusters 23 can be pivoted (e.g., with the pivoting being driven by an inflatable bubble) about an axis running at least approximately in the longitudinal direction of the seat, as schematically illustrated in FIG. 1. Only the right-hand one of the two side cheek adjusters 23 is shown in FIG. 1. Control devices for adjusters or the like may also be fastened to the seat cushion adapter 15. Cover attachments, disconnectors and guiding means may also be integrated in the seat cushion adapter 15. As an example, adhesive closures or receptacles for sealing strips may also be integrated in the seat cushion adapter 15, in particular in the front material portion 19 below or behind the seat surface extension 21.

A seat cushion pad 25 rests on the seat cushion adapter 15 and the associated subassemblies. The seat cushion pad 25 is designed in particular as a soft foam part and can fit entirely or partially over the seat cushion adapter 15 on the exposed sides. A seat cushion cover 27 is pulled and stretched over the seat cushion pad 25 and the seat cushion adapter 15, i.e. is fastened under prestress to the seat cushion structure 11 and possibly to the seat cushion adapter 15. By this means (e.g., tension in the cushion cover 27), the seat cushion adapter 15 and seat cushion structure 11 are fixedly held together. The seat cushion structure 11, the seat cushion adapter 15, the seat cushion pad 25, the seat cushion cover 27 and associated subassemblies define the seat cushion.

In addition to the extensive form-fitting connection, the fixed holding together of seat cushion adapter 15 and seat cushion structure 11 can additionally be achieved by, for example, provision of a type of snap fastener between a material portion of the seat cushion adapter 15 and an opening (which is present for other reasons) of the seat cushion structure 11, or a clip of spring steel or another frictional connection, or a screw connection or the like using existing openings of the seat cushion structure 11, with it being possible for fastening means, such as nuts or the like, but also perforated plates, to be foamed into (e.g., fixed to the foam of) the seat cushion adapter 15.

The vehicle seat 1 has, as a second seat component, an inclination-adjustable and freely pivotable backrest 30. The backrest 30 has a backrest structure 32. The backrest structure 32, which is also referred to as a backrest frame, is fixed on the rear end of the seat cushion structure 11 by way of two fittings 33. The largest dimension of the backrest structure 32 defines the longitudinal direction of the backrest 30.

As in the case of the seat cushion, single-piece rigid foam adapters are also provided in the backrest 30. On both sides of the vehicle seat, a respective backrest cheek adapter 34 of polyurethane rigid foam, of which only the right-hand one is illustrated in the drawing, is provided in the lower region of the backrest structure 32. Each backrest cheek adapter 34 bears extensively and with a form-fitting connection on the backrest structure 32. In addition, in order to pass on the forces acting transversely to the longitudinal direction of the backrest, the backrest cheek adapter 34 is screwed or fastened in some other way to the backrest structure 32 using an opening which is present there for other reasons. If, in a modified embodiment, the two backrest cheek adapters 34 are connected to each other and there is only a movement possibility in the installation direction, this screwing-on or connection in some other way may be omitted.

Figure 3:
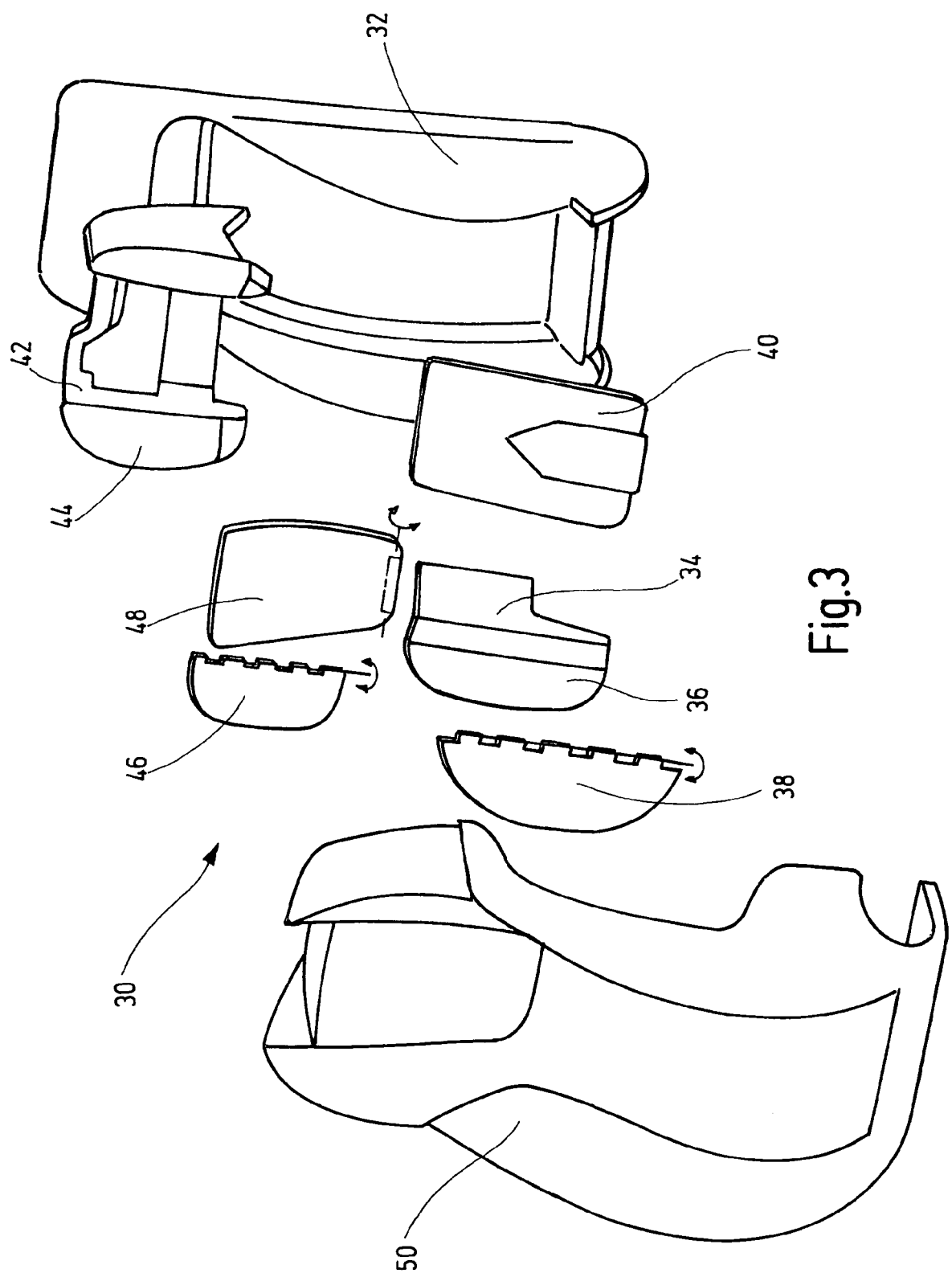
FIG. 3 shows an exploded drawing of a backrest of the exemplary embodiment.

In the longitudinal direction of the backrest, the backrest cheek adapter 34 has a lateral, raised, form-giving material portion 36 that has a supporting function in order to improve the lateral support of the occupant with respect to the backrest structure 32. As a passive crash protection function, the rigid foam can absorb and dissipate energy in the event of a crash. Individual subassemblies are optionally arranged or integrated on or adapted to the backrest cheek adapter 34, in particular they are mounted and/or fixed thereon. An example of such a subassembly is a backrest cheek adjuster 38 which, in principle, is constructed in the manner of the side cheek adjuster 23 and can be pivoted about an axis running at least approximately in the longitudinal direction of the backrest, as schematically shown in FIG. 3, where only the right-hand one of the two backrest cheek adjusters 38 is shown. Another example of such a subassembly is a lordosis support 40, the opposite sides of which are respectively fixed on the two backrest cheek adapters 34. Control devices for adjusters or the like may in turn be fastened to the backrest cheek adapter 34. Cover attachments, disconnectors and guiding means, for example adhesive closures or receptacles for sealing strips, may also be integrated in the backrest cheek adapters 34.

Arranged above the two backrest cheek adapters 34 is a shoulder support adapter 42 which in turn bears extensively and with a form-fitting connection on the backrest structure 32. Since this form-fitting bearing takes place on two opposite sides of the backrest structure 32, only a movement in the installation direction is possible. A screwing-on or fastening in some other manner of the shoulder support adapter 42 to the backrest structure 32, for example using an opening which is present there for other reasons, is therefore optional.

In the longitudinal direction of the backrest, the shoulder support adapter 42 has a respective lateral, raised, form-giving material portion 44 with a supporting function in order to improve the lateral support of the occupant with respect to the backrest structure 32. As a passive crash protection function, the rigid foam can absorb and dissipate energy in the event of a crash. Individual subassemblies are optionally arranged or integrated on or adapted to the shoulder support adapter 42, in particular the subassemblies are mounted and/or fixed on the shoulder support adapter 42. An example of such a subassembly is pair of shoulder cheek adjusters 46. The shoulder cheek adjusters 46 are constructed, in principle, in the same manner of the side cheek adjusters 23. The shoulder cheek adjusters 46 can be pivoted about an axis running at least approximately in the longitudinal direction of the backrest, as schematically illustrated in FIG. 3. Only the right-hand one of the two shoulder cheek adjusters 46 is shown in FIG. 3. Another example of such a subassembly is a shoulder inclination adjuster 48. The shoulder inclination adjuster 48 can, in principle, be constructed in the same manner of the side cheek adjuster 23. The shoulder inclination adjuster 48 and can be pivoted about an axis running at least approximately perpendicularly to the longitudinal direction of the backrest, as schematically shown in FIG. 3. Control devices for adjusters or the like can again be fastened to the shoulder support adapter 42. Cover attachments, disconnectors and guiding means can again be integrated in the shoulder support adapter 42.

A backrest pad 50 bears against the backrest cheek adapters 34, the shoulder support adapter 42 and the associated subassemblies, partially also directly against the backrest structure 32. The backrest pad 50 is designed in particular as a soft foam pad. The backrest pad 50 is able to entirely or partially fit over the adapters 34 and 42 on the exposed sides. A backrest cover 52 is pulled and stretched over the backrest pad 50 and the adapters 34 and 42, i.e. is fastened under prestress to the backrest structure 32 and possibly also to the adapters 34 and 42. By this means (e.g., tension in the backrest cover 52), the adapters 34 and 42, in particular the shoulder support adapter 42, on the one hand, and the backrest structure 32, on the other hand, are fixedly held together irrespective of whether one of the additional connections has also been undertaken.

It will be understood by those skilled in the art that while the present invention has been discussed above with reference to an exemplary embodiment, various additions, modifications and changes can be made thereto without departing from the spirit and scope of the invention as set forth in the following claims.

What is claimed is:

1. A vehicle seat comprising:
   a seat part and a backrest, wherein at least one seat component, which is selected from the group consisting of the seat part and the backrest, includes
   (a) a structure,
   (b) at least one adapter for functionally upgrading the structure, wherein the adapter is on the structure, there is a form-fitting connection between the adapter and the structure, the adapter bears against an extensive area of the structure, and the structure supports the adapter,
   (c) a pad bearing against the adapter, wherein the adapter is positioned between the pad and the structure, and
   (d) a cover fastened to the structure, wherein the cover is stretched over the pad, and the cover fixedly holds together the adapter and the structure, and the adapter substantially shapes at least a portion of the pad so that the portion of the pad is in a first predetermined configuration, and
   wherein the adapter functionally upgrading the structure comprises
   (1) the adapter substantially shaping the portion of the pad in the first predetermined configuration,
   (2) the structure adapted to support the pad without the adapter being positioned between the structure and the pad so that the portion of the pad is in a second predetermined configuration, and
   (3) the second predetermined configuration being substantially different from the first predetermined configuration.

2. The vehicle seat as claimed in claim 1, wherein the adapter is positioned between two mutually opposite sides of the structure.

3. The vehicle seat as claimed in claim 1, wherein the cover being stretched over the pad comprises:
   the cover being in tension, and
   the cover having been pulled over the pad.

4. The vehicle seat as claimed in claim 1, wherein the adapter is additionally fastened to the structure.

5. The vehicle seat as claimed in claim 1, wherein the adapter is a single piece of rigid foam.

6. The vehicle seat as claimed in claim 1, wherein:
   the seat component extends in a longitudinal direction;
   the adapter extends in the longitudinal direction of the seat component, and
   the adapter includes lateral form-giving material portions that are integrally formed on the adapter and are operative for laterally supporting an occupant sitting in the seat.

7. The vehicle seat as claimed in claim 6, wherein the adapter is a single piece of rigid foam.

8. The vehicle seat as claimed in claim 1, wherein the adapter is operative:
   for providing a passive crash protection function in response to a crash, and
   so that the passive crash protection function comprises material of the adapter absorbing and/or dissipating energy.

9. The vehicle seat as claimed in claim 8, wherein the adapter is a single piece of rigid foam.

10. The vehicle seat as claimed in claim 1, wherein at least one subassembly is operatively associated with the adapter.

11. The vehicle seat as claimed in claim 10, wherein the subassembly being operatively associated with the adapter comprises:

the subassembly being on the adapter.

12. The vehicle seat as claimed in claim 10, wherein:
the seat component is the backrest, whereby the backrest includes the adapter, and
the subassembly, which is operatively associated with the adapter, is selected from the group consisting of a lordosis support and a shoulder inclination adjuster.

13. The vehicle seat as claimed in claim 10, wherein:
the seat component is the seat part, whereby the seat part includes the adapter, and
the subassembly, which is operatively associated with the adapter, is selected from the group consisting of an anti-submarining ramp and a seat surface extension.

14. The vehicle seat as claimed in claim 10, wherein the subassembly is a cheek adjuster.

15. The vehicle seat as claimed in claim 1, wherein the adapter is configured for having at least one subassembly operatively associated therewith.

16. A vehicle seat comprising:
a seat part and a backrest, wherein the seat part includes
(a) a structure,
(b) at least one adapter on the structure,
(c) a pad bearing against the adapter, wherein the adapter is positioned between the pad and the structure,
(d) a cover fastened to the structure, wherein the cover is stretched over the pad, the cover fixedly holds together the adapter and the structure, the pad has a shape, and the adapter at least partially defining the shape of the pad, and
(e) at least one subassembly on the adapter, wherein the subassembly is a seat surface extension.

17. The vehicle seat as claimed in claim 16, wherein:
the seat part extends in a longitudinal direction;
the adapter extends in the longitudinal direction of the seat part, and
the adapter includes lateral form-giving material portions that are integrally formed on the adapter and are operative for laterally supporting an occupant sitting in the seat.

18. The vehicle seat as claimed in claim 16, wherein the adapter is a single piece of rigid foam.

19. The vehicle seat as claimed in claim 16, wherein there is a form-fitting connection between the adapter and the structure, and the adapter bears against an extensive area of the structure.

20. The vehicle seat as claimed in claim 19, wherein the adapter is additionally fastened to the structure.

21. The vehicle seat as claimed in claim 16, wherein the structure supports the adapter and the adapter is configured so that the adapter substantially shapes at least a portion of the pad so that the portion of the pad is in a first predetermined configuration.

22. The vehicle seat as claimed in claim 21, wherein the adapter is for functionally upgrading the structure at least with respect to shaping the pad, wherein the structure can support the pad without the adapter being positioned between the structure and the pad so that the portion of the pad is in a second predetermined configuration, and the second predetermined configuration is substantially different from the first predetermined configuration.

23. The vehicle seat as claimed in claim 16, wherein:
the structure includes four segments that are arranged end-to-end and together extend around a central opening of the structure;
the adapter includes four segments that are arranged end-to-end and together extend around a central opening of the adapter; and
the seat surface extension is positioned on a front segment of the four segments of the adapter.

24. A vehicle seat for being sat in by an occupant, the vehicle seat comprising:
a seat part and a backrest, wherein at least one seat component, which is selected from the group consisting of the seat part and the backrest, includes
(a) a structure,
(b) at least one foam adapter on the structure, wherein there is a form-fining connection between the foam adapter and the structure, and the foam adapter bears against an extensive area of the structure,
(c) at least one movably mounted subassembly for increasing comfort of the occupant sitting in the vehicle seat, wherein the movably mounted subassembly is on the foam adapter, and the movably mounted subassembly is selected from the group consisting of a seat surface extension, a cheek adjuster and a shoulder inclination adjuster,
(d) a foam pad bearing against the foam adapter and the movably mounted subassembly, wherein foam of the foam adapter is more rigid than foam of the foam pad and the foam adapter is positioned between the foam pad and the structure, and
(e) a cover fastened to the structure, wherein the cover is stretched over the foam pad, the cover fixedly holds together the foam adapter and the structure, the structure supports the foam adapter, and the foam adapter substantially shapes at least a portion of the foam pad.

25. The vehicle seat as claimed in claim 24, wherein:
the seat component extends in a longitudinal direction;
the foam adapter extends in the longitudinal direction of the seat component, and
the foam adapter includes lateral form-giving material portions that are integrally formed on the foam adapter and are operative for laterally supporting the occupant sitting in the seat.

26. The vehicle seat as claimed in claim 25, wherein:
the seat component is the backrest, whereby the backrest includes the foam adapter, and
the movably mounted subassembly, which is on the adapter, is selected from the group consisting of the shoulder inclination adjuster and the cheek adjuster.

27. The vehicle seat as claimed in claim 25, wherein:
the seat component is the seat part, whereby the seat part includes the foam adapter, and
the movably mounted subassembly, which is on the adapter, is selected from the group consisting of the seat surface extension and the cheek adjuster.

28. The vehicle seat as claimed in claim 24, wherein:
the foam adapter is a single piece of foam, and
the foam adapter includes four segments that are arranged end-to-end and together extend around a central opening that extends through the foam adapter.

29. The vehicle seat as claimed in claim 24, wherein the portion of the foam pad, which is substantially shaped by the foam adapter, is in a first predetermined configuration, the foam adapter is for functionally upgrading the structure, and the foam adapter functionally upgrading the structure comprises:
the foam adapter substantially shaping the portion of the foam pad in the first predetermined configuration, the structure being capable of supporting the pad without the adapter being positioned between the structure and the pad so that the portion of the pad is in a second predetermined configuration, and the second predetermined configuration being substantially different from the first predetermined configuration.

30. The vehicle seat as claimed in claim 24, wherein the foam adapter is additionally fastened to the structure.

31. The vehicle seat as claimed in claim 24, wherein:

the seat component is the seat part; and the movably mounted subassembly, which is on the foam adapter, is the seat surface extension.

* * * * *